United States Patent [19]
Fukagawa et al.

[11] Patent Number: 5,518,272
[45] Date of Patent: May 21, 1996

[54] FUEL BOMB MOUNTING STRUCTURE FOR AUTOMOBILE

[75] Inventors: Masami Fukagawa; Tatsuo Kasuga; Eisei Higuchi, all of Wako, Japan

[73] Assignee: Honda Giken Kogyo Kabushiki Kaisha, Tokyo, Japan

[21] Appl. No.: 362,275

[22] Filed: Dec. 22, 1994

[30] Foreign Application Priority Data

Dec. 28, 1993 [JP] Japan .................... 5-349371

[51] Int. Cl.⁶ .................................................. B60P 3/22
[52] U.S. Cl. ........................................ 280/834; 180/69.5
[58] Field of Search ............................... 280/830, 831, 280/834, 781, 783; 180/311, 69.4, 69.5

[56] References Cited

U.S. PATENT DOCUMENTS

| | | | |
|---|---|---|---|
| 5,370,418 | 12/1994 | Pugh | 280/831 X |
| 5,443,578 | 8/1995 | Davis, Jr. | 280/834 |

FOREIGN PATENT DOCUMENTS

| | | | |
|---|---|---|---|
| 67434 | 12/1982 | European Pat. Off. | 280/834 |
| 50-25851 | 8/1975 | Japan . | |
| 3-26988 | 6/1991 | Japan . | |
| 4-11517 | 1/1992 | Japan | 280/834 |

Primary Examiner—Kevin T. Hurley
Attorney, Agent, or Firm—Armstrong, Westerman, Hattori, McLeland & Naughton

[57] ABSTRACT

A bomb supporting frame for supporting fuel bombs which store pressurized gaseous fuel in an automobile. The bomb supporting frame is fixed on a floor provided on right and left rear side frames of a vehicular body, and simultaneously it is fixed on damper strut mounting portions of right and left rear wheel houses.

2 Claims, 5 Drawing Sheets

FUEL BOMB MOUNTING STRUCTURE FOR AUTOMOBILE

BACKGROUND OF THE INVENTION

1. Field of the Invention

The present invention relates to a structure for mounting a fuel bomb to a body of an automobile which runs using a gaseous fuel such as natural gas.

2. Description of the Related Art

A fuel bomb for natural gas or like, which has a rigid structure for withstanding the pressurization, is larger in size and heavy in weight as compared with a gasoline tank, and accordingly, it is usually mounted in back of a rear seat.

For a sedan type passenger car, there have been known examples in which a fuel tank is disposed between right and left rear wheel houses in back of a rear seat (Examined Japanese Utility Model Publication Nos. SHO 50-25851 and HEI 3-26988).

The example described in Examined Japanese Utility Model Publication No. SHO 50-25851 shows a fuel tank mounting structure for an automobile using gasoline as a fuel. The fuel tank in this example is supported such that the front and rear ends of the lower surface are supported by lower brackets fixed on a floor; and one end of the upper surface is supported by a bracket mounted on a body panel and the other end of the upper surface is fixed by band-mounting.

In the example described in Examined Japanese Utility Model Publication No. HEI 3-26988, the fuel tank itself is supported by the upper portion of a floor between rear wheel houses, and a tank case covering the fuel tank is disposed between the right and left rear wheel houses and fixed at the right and left ends thereof on suspension towers of the rear wheel houses.

In each of the above examples, a fuel tank is fixed on a floor between right and left rear wheel houses, and it does not contribute to the enhancement in the rigidity of a vehicular body.

In the case where the rigidity at the vicinity of rear wheels is low, particularly, a heavy fuel tank mounted near the rear wheels tends to deform the vicinity of rear wheels, and hence to exert adverse effect on the steering characteristic.

In the latter example (Examined Japanese Utility Model Publication No. HEI 3-26988), a tank case increases the rigidity of the rear portion of a vehicular body; however, it is not effective because the tank case does not support a heavy fuel tank.

Another disadvantage is that, in accelerating and decelerating operations, the tank case partially supports the inertia force of the fuel tank, and thereby the fuel tank is possibly moved.

SUMMARY OF THE INVENTION

In view of the foregoing, the present invention has been made, and its object is to provide a fuel bomb mounting structure for an automobile, wherein a fuel bomb is mounted between rear wheel houses for enhancing the rigidity at a vicinity of rear wheels thereby ensuring the steering characteristic, and for supporting the fuel bomb while dispersing the inertia force thereof in accelerating and decelerating operations.

To achieve the above object, according to the present invention, there is provided a fuel bomb mounting structure for an automobile of a type mounting a fuel bomb for storing a pressurized gaseous fuel, characterized in that a bomb supporting frame for supporting a fuel bomb is provided; and said bomb supporting frame is fixed on a floor provided on right and left rear side frames of a vehicular body, and is fixed on damper strut mounting portions of right and left rear wheel houses.

A bomb supporting frame for supporting a fuel bomb is fixed on a floor provided on right and left rear side frames; consequently, the rear side frames are integrally connected to each other, thus enhancing the rigidity of a vehicular body. The bomb supporting frame is simultaneously supported on damper strut mounting portions of right and left rear wheel houses; consequently, the right and left damper strut mounting portions are integrally connected to each other, thus enhancing the mounting rigidity for the fuel bomb. The bomb supporting frame can thus improve the rigidity at the vicinity of the rear wheels as a whole.

The improvement in the rigidity near the rear wheel makes it possible to stably maintain the steering characteristic, and to support the fuel bomb while dispersing the inertia force thereof in accelerating and decelerating operations.

DESCRIPTION OF THE PREFERRED EMBODIMENT

Hereinafter, one embodiment of the present invention will be described with reference to FIGS. 1 to 5.

Figure 1:
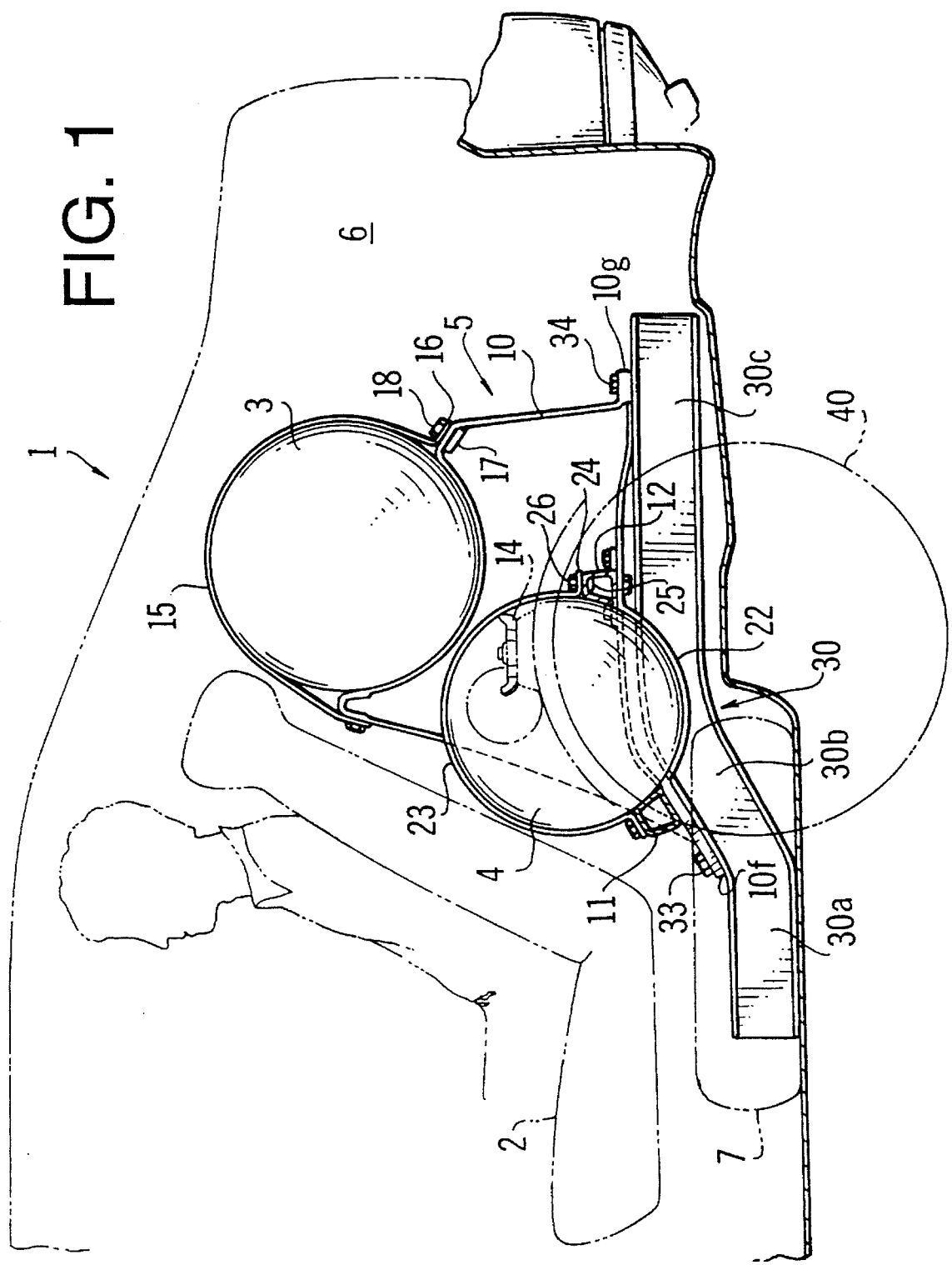
FIG. 1 is a side view in perspective of a rear half portion of an automobile according to one embodiment of the present invention.
Figure 2:
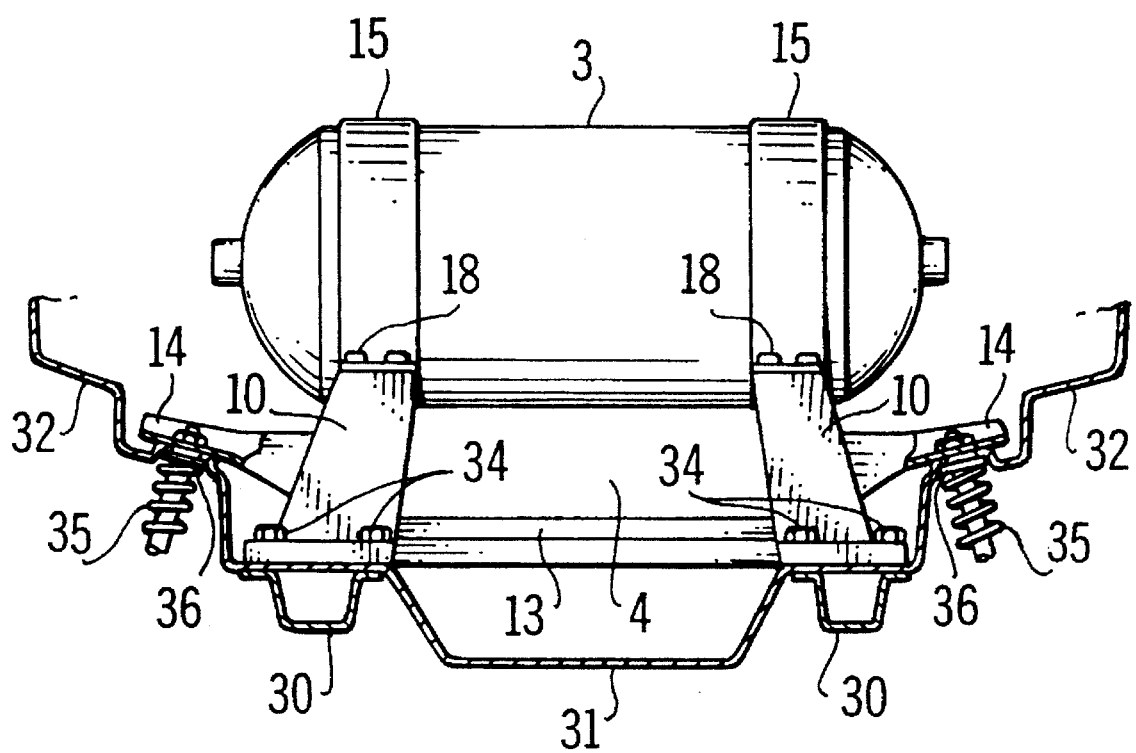
FIG. 2 is a rear view, partially cut-away, of the rear half portion of the automobile shown in FIG. 1.

FIG. 1 is a side view in perspective of a rear half portion of an automobile 1 according to this embodiment; and FIG. 2 is a rear view, partly cut-away, of the rear half portion of the automobile.

The automobile 1 is of a type which runs using natural gas as a fuel and it has a pressurized fuel bomb for storing compressed natural gas.

A large and small sized fuel bombs 3 and 4 are supported by a bomb supporting frame 5 in back of a rear seat 2 of the automobile 1. A space in back of the fuel bombs 3 and 4 forms a trunk room 6.

A spare tire 7 is contained under the rear seat 2.

Figure 3:
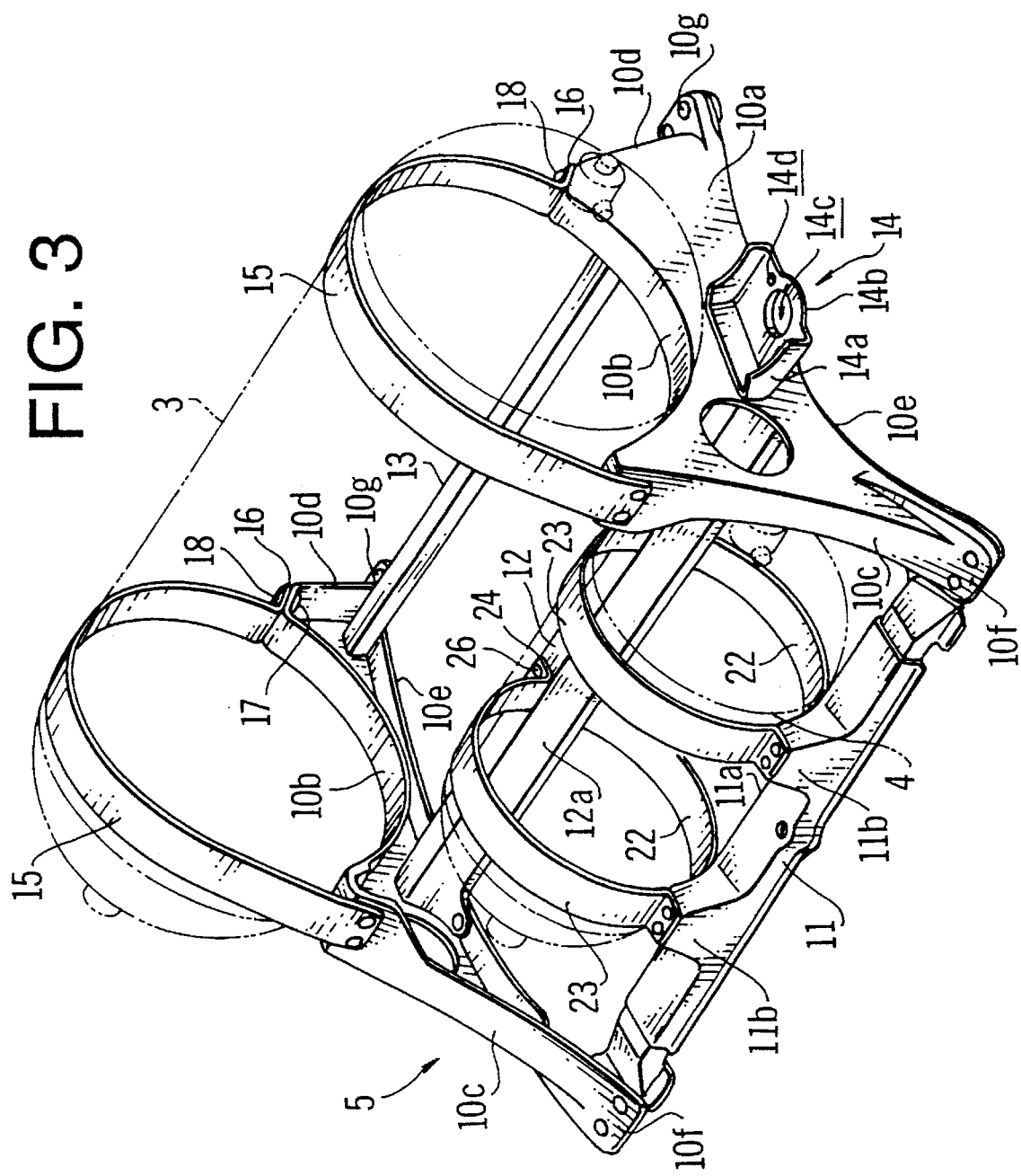
FIG. 3 is a perspective view of a bomb supporting frame.

As shown in FIG. 3, the bomb supporting frame 5 for supporting the fuel bombs 3 and 4 has right and left side supporting frames 10 and 10 which are erected so as to be opposed to each other. The side supporting frames 10 and 10 are connected to each other by means of cross-members 11, 12 and 13, disposed in the longitudinal direction thus forming the integral bomb supporting frame 5.

In the side supporting frame 10, the arcuate upper portion of a side wall 10a is inwardly curved while being higher at both the edges thereof, to form a band-like upper edge supporting portion 10b curved downwardly in the arcuate shape. A large fuel bomb 3 is mounted between the right and left upper edge supporting portions 10b and 10b.

Each of a front edge portion 10c, rear edge portion 10d, and lower edge portion 10e of the side supporting frame 10 is also curved inwardly in a band-shape for enhancing the rigidity. In the lower edge portion 10e, the longitudinal portion extending from the center to the rear side is held substantially in the horizontal direction, and the front portion is tilted slightly downwardly in the forward direction.

A mounting portion 10f having bolt-holes is formed at the front end, of the lower edge portion 10e, tiltingly projecting in the forward direction from the joint portion with the front edge portion 10c. On the other hand, a mounting portion 10g having bolt-holes is formed at the rear end, of the lower edge portion 10e, projecting in the rearward direction from the joint portion with the rear edge portion 10d.

On the outer surface of the side wall 10a of the side supporting frame 10, a bracket 14 is provided to project at a specified position which is slightly lower than the lowermost point of the upper edge supporting portion 10b curved in the arcuate shape and near the front side.

The bracket 14 is positioned to be overlapped on a damper strut mounting portion 32d of a wheel house 32 described later. In the bracket 14, an circular hole 14c is formed at the center of a horizontal portion 14b surrounded by a U-shaped frame portion 14a, and bolt-holes 14d and 14d are formed before and after the circular hole 14c.

One end of each of belts 15 and 15 is fixed at the upper end of each of the right and left front edge portions 10c, and a stop tab having a bolt-hole is provided at the other end of the belt 15. A female screw portion 17 corresponding to the stop tab 16 is provided at the upper end of the rear edge portion 10d.

The large sized fuel bomb 3 is mounted such that both the end portions are placed on the arcuately recessed upper edge supporting portions 10b and 10b of the right and left side supporting frames 10 and 10. The fuel bomb 3 is held by each of the belts 15, 15 from the upper side, and is fixed by fastening the stop tab 16 at the leading edge of the belt 15 to the opposed female screw portion 17 by means of the bolt 18.

On the other hand, the front cross-member 11 and the intermediate cross-member 12 have arcuate surfaces 11a and 12a, respectively, which are slightly directed upwardly and opposed to each other. Lower supporting belts 22 and 22 are hung in the widthwise direction between both the cross-members 11 and 12 in such a manner as to be slightly loosened. The small sized fuel bomb 4 is supported by supporting belts 22, 22 such that the outer peripheral surface thereof is contacted with the arcuate surfaces 11a and 12a of the cross-members 11 and 12.

One-side ends of bets 23, 23 are fixed on bulged portions 11b and 11b which are bulged upwardly along the arcuate surface 11a from two portions disposed in the widthwise direction of the cross-member 11. A stop tab 24 having a bolt-hole is provided at the other end of the belt 23. A female screw portion 25 corresponding to the stop tab 24 is provided on the cross-member 12.

The small size fuel bomb 4 is supported by the cross-members 11 and 12. It is held by each of the belts 23, 23 from the upper side, and is fixed by fastening the stop tab 24 at the leading edge of the belt 23 to the opposed female screw portion 24 by means of a bolt 26.

In this way, the bomb supporting frame 5 mounts the fuel bombs 3 and 4 and fastens/supports them by the belts 15 and 23. Hereinafter, the mounting of such a bomb supporting frame 5 to a vehicular body will be described.

In the rear portion of a vehicular body, right and left rear side frames 30 extend in the longitudinal direction from the rear seat 2 to the trunk room 6, as shown in FIG. 1. Each of the right and left side frames 30 extends from a front side horizontal portion 30a under the rear seat 2, tilting upwardly in the rearward direction to a tilting portion 30b, and it reaches a rear side horizontal portion 30c under the trunk room 6.

Figure 4:
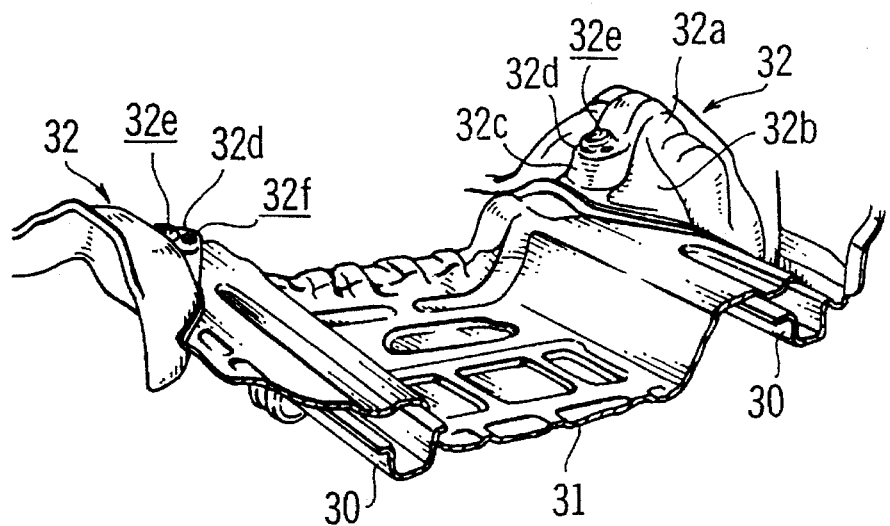
FIG. 4 is a perspective view of a rear portion of a vehicular body, with parts partially omitted.

As shown in FIG. 4, a rear floor 31 is wholly extended between the right and left rear side frames 30 such that the right and left side portions of the rear floor 31 are mounted on the right and left rear side frames 30. Wheel houses 32 are disposed in the right and left while extending from the tilting portions 30b to the front portion of the rear side horizontal portions 30c of the right and left rear side frames 30

The wheel house 32 includes a curving portion 32a for covering the upper portion of a rear wheel 40 and a side wall 32b. A damper upper portion containing portion 32c, which is bulged inwardly so as to be partially formed in a cylindrical shape, is formed on the side wall 32b.

A damper Strut mounting portion 32d as a cylindrical cover portion of the damper Upper portion containing portion 32c is formed substantially in the horizontal plane. A circular hole 32e is perforated at the center of the damper Strut mounting portion 32d, and bolt-holes 32f are formed before and after the circular hole 32e.

The bomb supporting frame 5 is mounted on the right and left rear side frames 30 by way of the rear floor 31, as shown in FIGS. 1 and 2. The front end mounting portion 10f of the side supporting frame 10 is positioned at the tilting portion 30b of the rear side frame 30, and the rear end mounting portion 10g is positioned at the rear side horizontal portion 30c. Both the above portions are fixed on the rear side frame 30 together with the rear floor 31 by bolts 33 and 34.

Figure 5:
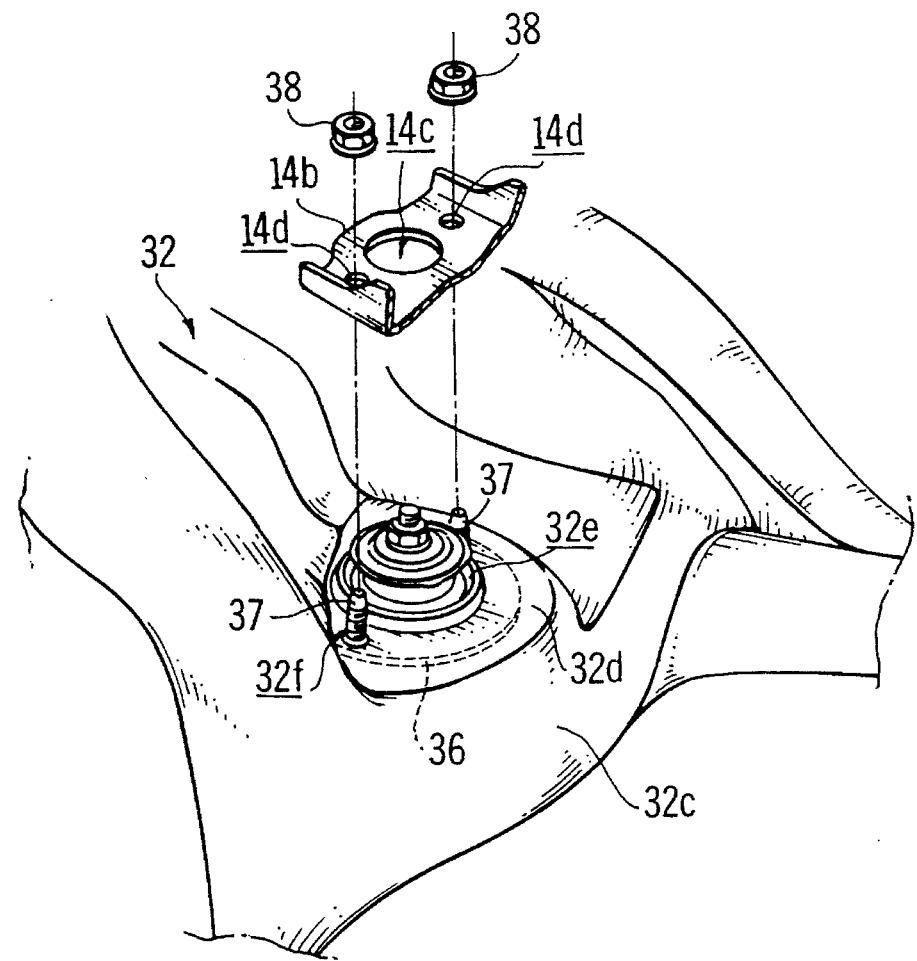
FIG. 5 is an exploded view in perspective of the structure of mounting a bracket on the bomb supporting frame side to a wheel house.

The bracket 14 projectingly provided on the side wall 10a of the side supporting frame 10 is, as shown in FIG. 5, overlapped on the damper strut mounting portion 32d of the wheel house 32. At this time, the circular hole 14c, 32e and the bolt-holes 14d, 32f of the bracket 14 and the damper strut mounting portion 32d correspond to each other. A mounting base 36 of a rear damper 35 contacted with the lower surface of the damper strut mounting portion 32d is partially inserted in the circular holes 14c and 32e from the lower side, and fore and aft bolts 37 projectingly provided on the mounting base 36 pass through the bolt-holes 14d and 32f. Thus, by screwing flange nuts 38 to the bolts 37, the bracket 14 of the bomb supporting frame 5 is integrally fixed on the damper strut mounting portion 32d of the wheel house 32 together with the mounting base 36 of the rear damper 35.

As described above, a bomb supporting frame 5 is fixed on a floor 31 provided on right and left rear side frames 30, so that the rear side frames are integrally connected to each other, thereby enhancing the rigidity of the vehicular body. The bomb supporting frame 5 is simultaneously fixed on damper strut mounting portions 32d of right and left rear wheel houses 32, so that the right and left damper strut mounting portions are integrally connected to each other, thereby enhancing the mounting rigidity for the fuel bomb. Thus, the bomb supporting frame 5 can improve the rigidity near the rear wheels as a whole.

The improvement in the rigidity near the rear wheels makes it possible to stably maintain the steering characteristic, and to support the fuel bomb while dispersing the inertia force of the fuel bomb during accelerating and decelerating operations.

Figure 6:
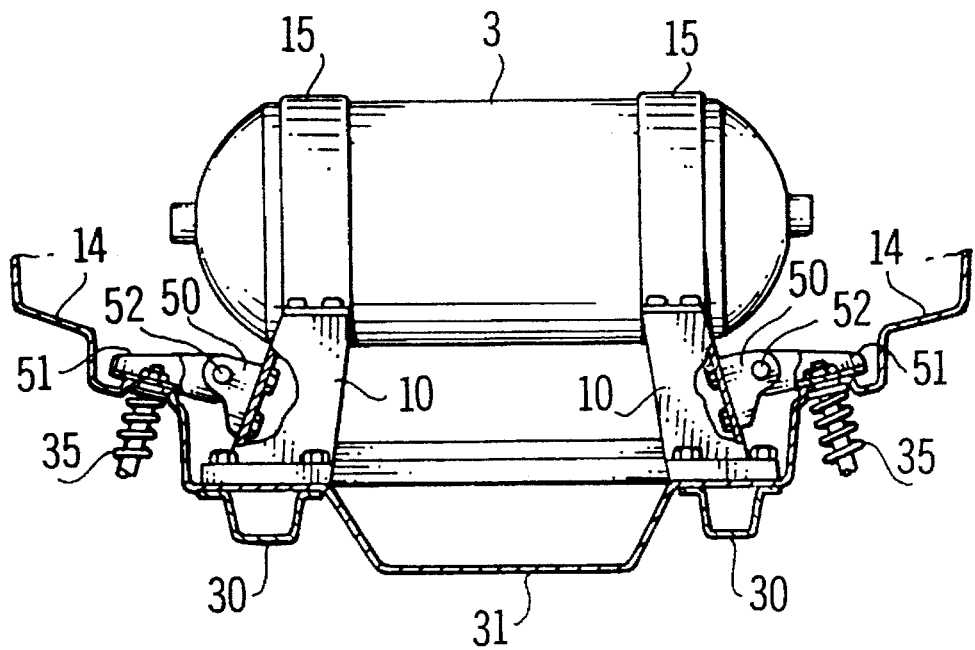
FIG. 6 is a rear view of the structure of mounting a bomb supporting frame according to another embodiment.

Another embodiment will be described below with reference to FIG. 6.

This embodiment has the same structure as the bomb supporting frame 5 in the previous embodiment, except that a mount 50 is projectingly provided in place of the bracket 14 projectingly provided on the side supporting frame 10. In this embodiment, members corresponding to those in the previous embodiment are designated at the same reference numerals.

A bracket 51 is previously fixed on the damper strut mounting portion 32*d* of the wheel house 32. After the fuel bombs 3 and 4 are mounted on and supported by the bomb supporting frame 5, each mount 50 is connected to the bracket 51 by a supporting shaft 52 arranged in the longitudinal direction.

Since the upper mounting base 36 of the rear damper 35 can be fixed on the wheel house 32 independently from the mounting of the bomb supporting frame 5, the mounting operation for the bomb supporting frame 5 can be easily performed.

Figure 7:
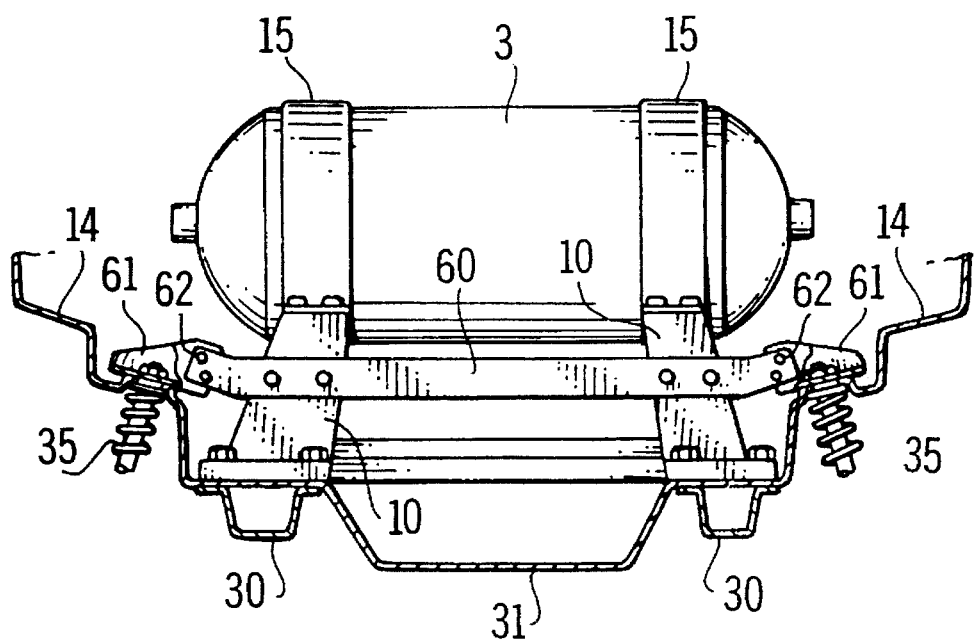
FIG. 7 is a rear view of the structure of mounting a bomb supporting frame according to a further embodiment.

A further embodiment will be described with reference to FIG. 7.

This embodiment has the same structure as that of the bomb supporting frame 5 in the previous embodiment (the same members are designated at the same reference numerals), except that the front edge portions 10*c* and the rear edge portions of the right and left side supporting frames 10 are respectively connected to each other by the connecting member 60, and the connecting member 60 further extends in the widthwise direction.

The bracket 61 is previously fixed on the damper strut mounting portion 32*d* of the wheel house 32. After the fuel bombs 3 and 4 are mounted on and supported by the bomb supporting frame 5, each extending portion of the connecting member 60 is fixed on the bracket 61 by a bolt 62.

The presence of the connecting member 60 further improves the rigidity of the bomb supporting frame 5.

According to the present invention, a bomb supporting frame for supporting a fuel bomb is fixed on a floor provided on right and left rear side frames, so that the rear side frames are integrally connected to each other, thereby enhancing the rigidity of the vehicular body. The bomb supporting frame is simultaneously fixed on damper strut mounting portions of right and left rear wheel houses, so that the right and left damper strut mounting portions are integrally connected to each other, thereby enhancing the mounting rigidity for the fuel bomb. Thus, the bomb supporting frame can improve the rigidity near the rear wheels as a whole.

The improvement in the rigidity near the rear wheels makes it possible to stably keep the steering characteristic, and to support the fuel bomb while dispersing the inertia force of the fuel bomb upon accelerating and decelerating operations.

What is claimed is:

1. A fuel bomb mounting structure in combination with an automobile having a vehicular body with right and left rear side frames and right and left rear wheel houses, the automobile mounting a fuel bomb for storing a pressurized gaseous fuel comprising:

a bomb supporting frame for supporting a fuel bomb, wherein said bomb supporting frame is fixed on a floor provided on the right and left rear side frames of the vehicular body, and on damper strut mounting portions of the right and left rear wheel houses.

2. The combination recited in claim 1, wherein said bomb supporting frame comprises:

right and left side supporting frames which are erected so as to be opposed to each other;

a cross-member connecting said side supporting frames to each other; and brackets projectingly provided on said side supporting frames to be fixed on said damper strut mounting portions.

* * * * *